(12) United States Patent
Boelter et al.

(10) Patent No.: US 8,955,746 B2
(45) Date of Patent: Feb. 17, 2015

(54) PROVIDING A LOCKING TECHNIQUE FOR ELECTRONIC DISPLAYS

(71) Applicant: Intel Corporation, Santa Clara, CA (US)

(72) Inventors: Joshua Boelter, Portland, OR (US); Don G. Meyers, Rescue, CA (US); David Stanasolovich, Albuquerque, NM (US); Sudip S. Chahal, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 13/628,156

(22) Filed: Sep. 27, 2012

(65) Prior Publication Data
US 2014/0087656 A1   Mar. 27, 2014

(51) Int. Cl.
*G06K 7/01* (2006.01)
(52) U.S. Cl.
USPC .................. 235/382.5; 235/382; 235/487
(58) Field of Classification Search
CPC ......... G06K 1/00; G06K 19/077; G06K 5/00; G06K 7/01; G06K 19/00; G06K 19/06; G06K 7/08; G06Q 20/105; G06Q 20/385; G06Q 20/4093
USPC ............... 235/382, 382.5, 487, 380, 451, 492
See application file for complete search history.

(56) References Cited

U.S. PATENT DOCUMENTS

| | | | |
|---|---|---|---|
| 6,079,621 A | 6/2000 | Vardanyan et al. |
| 6,095,416 A | 8/2000 | Grant et al. |
| 6,179,205 B1 | 1/2001 | Sloan |
| 6,233,684 B1 | 5/2001 | Stefik et al. |
| 6,273,335 B1 | 8/2001 | Sloan |
| 6,494,367 B1 | 12/2002 | Zacharias |
| 6,720,860 B1 | 4/2004 | Narayanaswami |
| 6,817,530 B2 | 11/2004 | Labrec et al. |
| 6,924,781 B1 | 8/2005 | Gelbman |
| 7,140,550 B2 | 11/2006 | Ramachandran |
| 7,224,995 B2 | 5/2007 | Rhoads |

(Continued)

FOREIGN PATENT DOCUMENTS

| CN | 201604388 | 10/2010 |
|---|---|---|
| CN | 202153345 | 2/2012 |

(Continued)

OTHER PUBLICATIONS

Solicore, "Embedded Power Solutions, Powered Cards," 2010, 2 pages.

(Continued)

*Primary Examiner* — Edwyn Labaze

(74) *Attorney, Agent, or Firm* — Trop, Pruner & Hu, P.C.

(57) ABSTRACT

In one embodiment, the present invention includes a method for receiving in a persistent electronic display an authentication code from an end user, determining whether the received authentication code corresponds to a stored authentication code, and displaying a selected image on the persistent electronic display if the received authentication code corresponds to the stored authentication code, and otherwise displaying an obscured image on the persistent electronic display. This obscured image may be in an unreadable format in which information of the selected image is unreadable but a type of document represented by the selected image is determinable. Other embodiments are described and claimed.

21 Claims, 9 Drawing Sheets

(56) References Cited

U.S. PATENT DOCUMENTS

| | | |
|---|---|---|
| 7,254,560 B2 | 8/2007 | Singhal |
| 7,353,014 B2 | 4/2008 | Chetty |
| 7,389,269 B1 | 6/2008 | Robinson et al. |
| 7,434,048 B1 | 10/2008 | Shapiro et al. |
| 7,502,937 B2 | 3/2009 | McKinley et al. |
| 7,593,000 B1 | 9/2009 | Chin |
| 7,669,245 B2 | 2/2010 | Jung et al. |
| 7,733,231 B2 | 6/2010 | Carney et al. |
| 7,739,510 B2 | 6/2010 | Jung et al. |
| 7,748,627 B2 | 7/2010 | Gelbman |
| 7,751,585 B2 | 7/2010 | Jancke |
| 7,796,013 B2 | 9/2010 | Murakami et al. |
| 7,865,734 B2 | 1/2011 | Jung et al. |
| 7,874,488 B2 | 1/2011 | Parkinson |
| 8,009,147 B2 | 8/2011 | Chang et al. |
| 8,024,361 B2 | 9/2011 | Daughtry et al. |
| 8,058,972 B2 | 11/2011 | Mohanty |
| 8,065,525 B2 | 11/2011 | Zilberman |
| 8,112,066 B2 | 2/2012 | Ayed |
| 8,136,053 B1 | 3/2012 | Miller et al. |
| 8,159,328 B2 | 4/2012 | Luckhardt |
| 8,190,129 B2 | 5/2012 | Ayed |
| RE43,716 E | 10/2012 | Wang |
| 2002/0010698 A1 | 1/2002 | Shin et al. |
| 2002/0172363 A1 | 11/2002 | Dierks et al. |
| 2003/0179073 A1 | 9/2003 | Ghazarian |
| 2005/0219224 A1 | 10/2005 | Liebenow |
| 2006/0080260 A1 | 4/2006 | Chen et al. |
| 2006/0161977 A1 | 7/2006 | Jung et al. |
| 2006/0187060 A1 | 8/2006 | Colby |
| 2006/0288427 A1 | 12/2006 | Fuse et al. |
| 2007/0075130 A1 | 4/2007 | Potrykus |
| 2007/0241183 A1 | 10/2007 | Brown et al. |
| 2007/0246529 A1 | 10/2007 | Lalo et al. |
| 2008/0122219 A1 | 5/2008 | Dunnigan et al. |
| 2008/0135629 A1 | 6/2008 | Douglas |
| 2008/0148396 A1 | 6/2008 | Jung et al. |
| 2008/0296367 A1 | 12/2008 | Parkinson |
| 2009/0037173 A1 | 2/2009 | Hansen |
| 2009/0222349 A1 | 9/2009 | Burger et al. |
| 2009/0254484 A1 | 10/2009 | Forero et al. |
| 2009/0278657 A1 | 11/2009 | Kawashima et al. |
| 2010/0127083 A1* | 5/2010 | Brown et al. .................. 235/492 |
| 2010/0328225 A1 | 12/2010 | Black |
| 2011/0047074 A1 | 2/2011 | Cai |
| 2011/0055587 A1 | 3/2011 | Jung et al. |
| 2011/0088100 A1 | 4/2011 | Rutman |
| 2011/0102141 A1 | 5/2011 | Wu |
| 2011/0140841 A1 | 6/2011 | Bona et al. |
| 2011/0191840 A1 | 8/2011 | Ortiz et al. |
| 2011/0215161 A1 | 9/2011 | Jung et al. |
| 2011/0276425 A1 | 11/2011 | Mullen |
| 2011/0279242 A1 | 11/2011 | Krawczewicz |
| 2011/0296530 A1 | 12/2011 | Tsai et al. |
| 2012/0002244 A1 | 1/2012 | Rothschild |
| 2012/0052800 A1 | 3/2012 | Bona et al. |
| 2012/0066740 A1 | 3/2012 | Doughty et al. |
| 2012/0181333 A1 | 7/2012 | Krawczewicz et al. |
| 2014/0035720 A1* | 2/2014 | Chapman .................. 340/5.51 |

FOREIGN PATENT DOCUMENTS

| | | |
|---|---|---|
| CN | 101699473 | 3/2012 |
| DE | 102005043053 | 9/2005 |
| DE | 102004018002 | 11/2005 |
| EP | 1225500 | 6/2004 |
| EP | 1575004 | 9/2005 |
| FR | 2950985 | 7/2009 |
| GB | 2445373 | 9/2008 |
| JP | 2004185408 | 7/2004 |
| JP | 200641801 | 2/2006 |
| JP | 2006053688 | 2/2006 |
| KR | 20010070865 | 6/2001 |
| KR | 1020100130832 | 12/2010 |
| KR | 101100700 | 12/2011 |
| WO | WO0036560 | 6/2000 |
| WO | WO0104793 | 1/2001 |
| WO | WO2007027791 | 3/2007 |
| WO | WO2009087547 | 7/2009 |
| WO | WO2009095263 | 8/2009 |
| WO | WO2010043816 | 4/2010 |
| WO | WO2011123244 | 10/2011 |
| WO | WO2012067640 | 5/2012 |

OTHER PUBLICATIONS

Tim Leberecht, "Troika: Smart, Multifunctional Identity Card of the Future?," Apr. 11, 2009, 1 page.
Gizmag Team, "Anti-fraud credit card features E-Ink display," Nov. 19, 2009, 1 page.
Kobsa, et al., "Usability of Display-Equipped RFID Tags for Security Purposes," Proceedings of the 16th European Conference on Research in Computer Security, 2011, 18 pages.
Rishab Nithyanand, "The Evolution of Cryptographic Protocols in Electronic Passports," 2009, 12 pages.
Rishab Nithyanand, "Securing Personal RFID Tags and Infrastructures, THESIS," 2010, 97 pages.
Christopher Northwood, "Evaluation of a rhythm based user authentication system for mobile devices, Project report submitted in part-fulfilment for BEng Computer Science in the Department of Computer Science, University of York" Mar. 17, 2009, 72 pages.
Zoe Antoniou and Dimitris N. Kalofonos, "NFC-Based Mobile Middleware for Intuitive User Interaction With Security in Smart Homes," Nokia Research Center Cambridge, 2006, 6 pages.
Robert Moskovitch, et al., "Identity Theft, Computers and Behavioral Biometrics," 2009, 6 pages.
Stephen August Weis, "Security and Privacy in Radio-Frequency Identification Devices," Submitted to the Department of Electrical Engineering and Computer Science, May 2003, 79 pages.
Soo-Hyun Choi, et al., "A Secure and Scalable Transaction Protocol for Ubiquitous Sensor Network using RFID Systems," Feb. 17-20, 2008, 4 pages.
Computer Weekly.com, "Digisafe manages to lock documents away," Apr. 29, 2002, 2 pages.

* cited by examiner

PROVIDING A LOCKING TECHNIQUE FOR ELECTRONIC DISPLAYS

BACKGROUND

With the ever increasing prevalence of computers and electronic devices in today's society, security concerns are manifested in that a wide variety of information accessible by such devices is potentially subject to attack. This is particularly so with the always expanding variety of electronic devices including tablet computers, smartphones, electronic readers (e-reader) and so forth, on which users store and access secure information. In addition to concern for electronic communications, security concerns also exist for the display of sensitive information, both in the form of conventional documents such as paper documents, identification documents such as driver's licenses, passports and the like, and credit cards, debit cards and other financial-based cards, and on electric displays.

To this end, various security mechanisms exist to add a level of security to cards and other devices by way of a security layer that enables the information on the card to be hidden from view unless an authorized user is seeking to access the card or other device. However, these devices are relatively complex, expensive and also can be confusing to a user, as in a transparent state, the user may not know what card is actually being accessed.

DETAILED DESCRIPTION

In various embodiments, techniques are provided to enable a user to protect paper documents, identification cards, credit cards and other types of access cards, in addition to electronic paper (e-paper), electronic ink (e-ink) displays, auxiliary displays and so forth by way of various lockable techniques. As used herein, an e-paper or an e-ink display is essentially a form of electronically controllable display that does not require persistent power to maintain displayed content.

More specifically, embodiments may provide a security mechanism to such devices by rendering content to be protected, such as identification information, personal information, financial information and so forth, in an unreadable state, e.g., by way of some type of distortion mechanism. Although the information is unreadable due to this distortion, embodiments may allow a user to still be able to identify the type of underlying image such that when multiple images are available for display, the user can select one of these images for unlocking and proper display. Thus the unreadable image still provides a user with some idea of what the image is without actually displaying the image.

In some embodiments such as for a passport, the object may be according to a write once and many update policy, where multiple pages can be included and dynamically updated. Or an issued document may be fixed. Other usages enable a user to protect self-created content, which can be added to over time. As an example, a number of identification, credit card, debit cards and other cards, can be stored on a single e-paper document. Then the document can be updated each time a new document is received by the end user.

Note that embodiments can be applied to many different physical objects, ranging from paper-based objects such as an e-paper document, to e-ink displays such as present on an e-reader, tablet computer or other portable computing device, to protection of more conventional displays such as liquid crystal display (LCD) or light emitting diode (LED) displays of portable devices such as smartphones, tablet computers, Ultrabooks™ and so forth. Particularly with regard to Ultrabooks™, notebooks and other thin and light devices having a clamshell-based design, embodiments may be applied to an auxiliary display located on a back side of a display portion of the system.

In general, an e-paper document may be generated by obtaining one or more images to be displayed and storing them in a non-volatile memory of the e-paper document. In general, the e-paper document may include one or more storage means, one or more processing means including a display rendering means, and a display means, such as an e-ink display that enables a rendered image to remain visible on the display persistently, even when the e-paper document is not powered.

Figure 1:
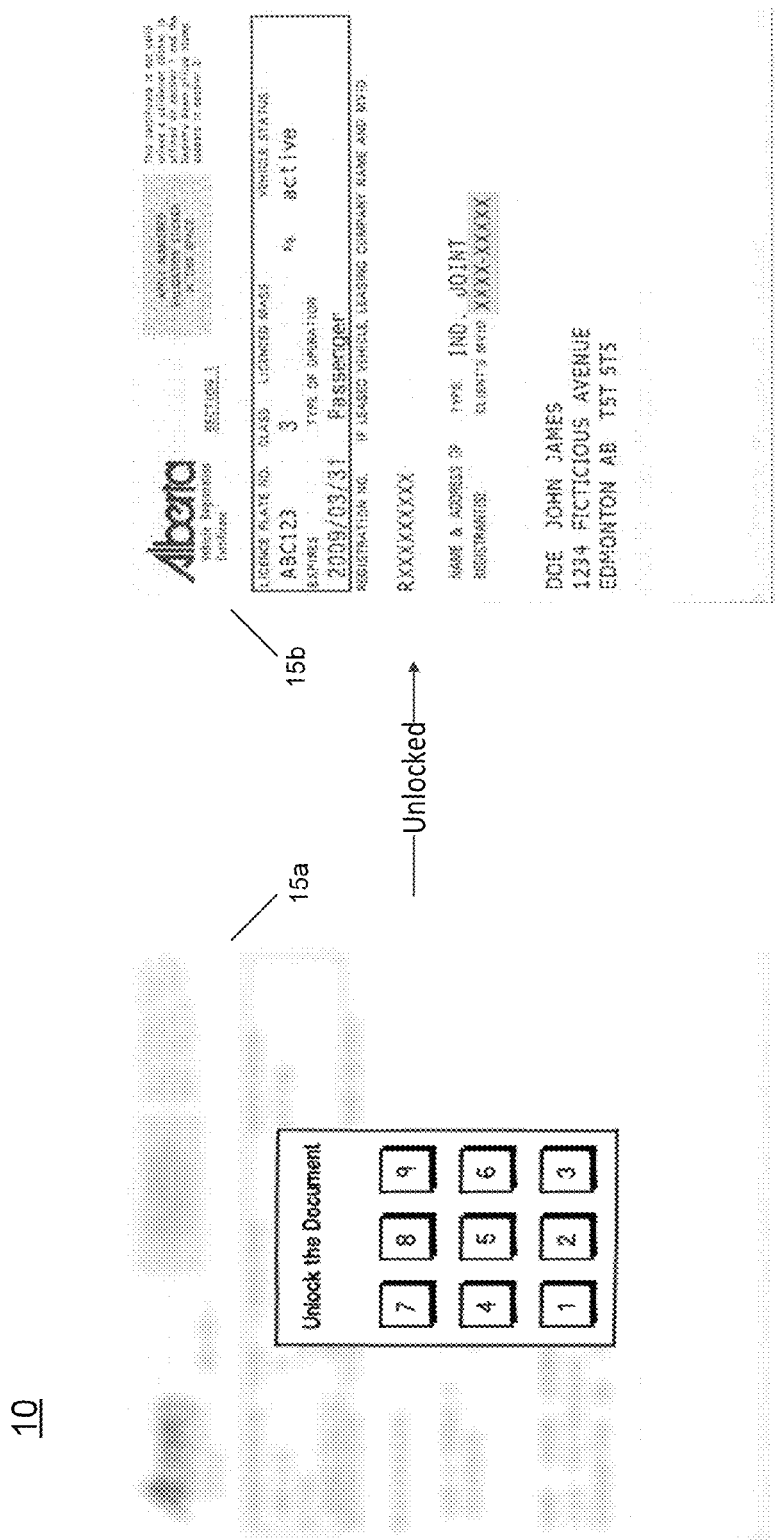
FIG. 1 is an illustration of a locking mechanism in accordance with an embodiment of the present invention implemented within an e-paper document.

Referring now to FIG. 1, shown is an illustration of a locking mechanism in accordance with an embodiment of the present invention implemented within an e-paper document. As shown in FIG. 1, an e-paper document 10 is present. In general, e-paper 10 (also referred to as a "document") is a piece of paper or other flexible material that includes a battery or other power supply, an input mechanism such as a capacitive or resistive touch mechanism, and a small amount of compute capacity such that it is a self-contained device that can display content loaded to it, and accept user input to lock and unlock the device. In the illustration shown, document 10 may be a vehicle registration. In one implementation, this registration document may be generated by an issuing authority, such as a state department of motor vehicles (DMV) or other issuing entity. In yet other implementations, the e-paper document may be generated by an intermediary between the issuing entity and an end user. In still other embodiments, the end user himself may generate the document.

To provide a measure of security, embodiments enable a locked state for document 10, illustrated as including an image frame 15a that is in an unreadable or distorted state (but including a readable keypad or other unlock mechanism). Different manners of providing obscuration of a document can be present. For example, a blur may be applied to the image to render it unreadable. Or a pixel manipulation process may be performed to randomly rearrange at least some of the pixels of the image to cause the image to be unreadable. In any event, even in this distorted or unreadable state, a user may still be able to identify the type of document although the actual information within the image is unreadable. Further shown in FIG. 1 is the same document 10 in an unlocked state in which image frame 15b clearly shows the information of the image, namely the registration information. Thus when an approved authentication or unlock code is entered, the actual content is rendered on the display. In other words, the content is rendered on demand responsive to an authorized access. While FIG. 1 is a representation of an e-paper document, understand the scope of the present invention is not limited in this regard and the locking mechanism described above can be applied to various electronic displays, including e-ink displays, LCD, LED, and other types of electronic displays.

Figure 2:
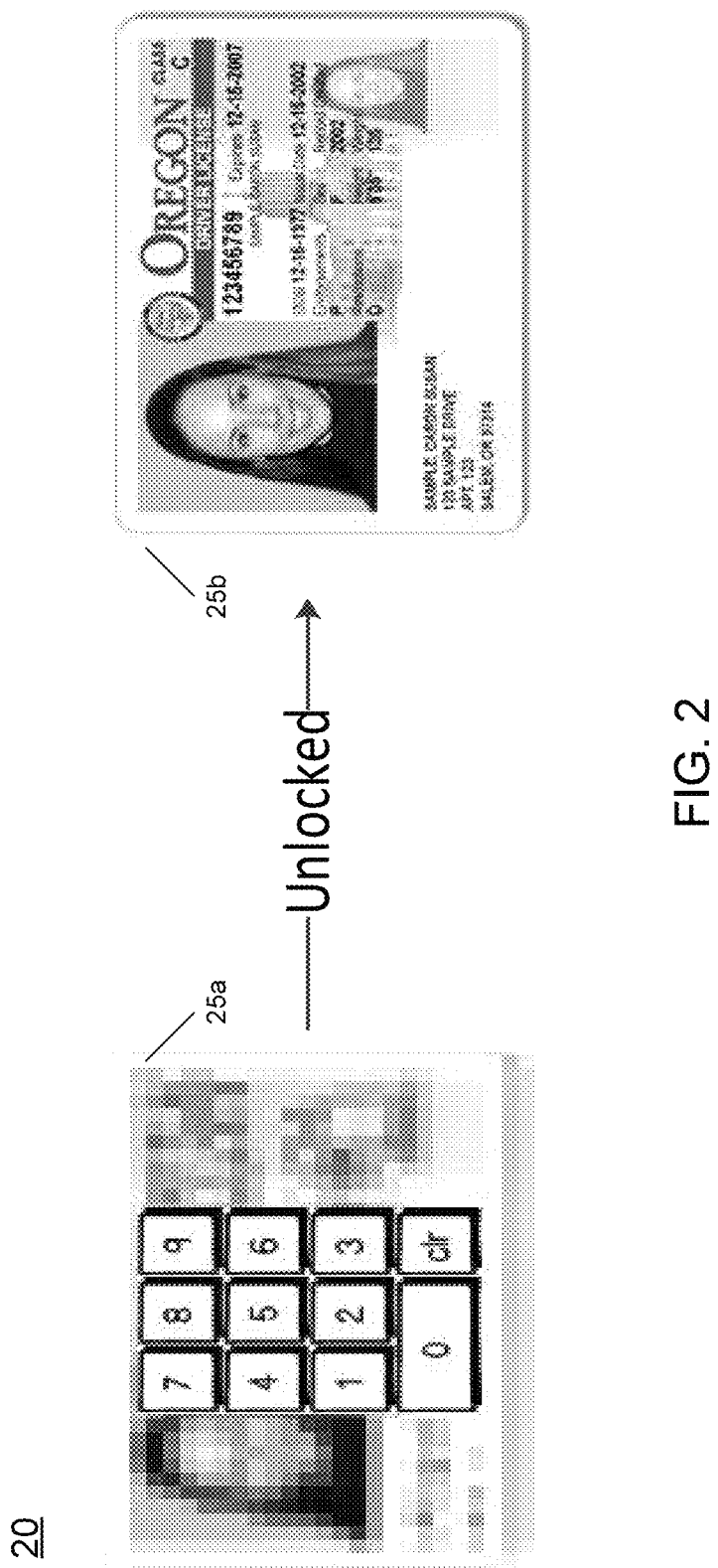
FIG. 2 is an illustration of a locking mechanism in accordance with another embodiment of the present invention applied to a driver's license.

Similar locking mechanisms can be applied to other types of objects such as a driver's license or other identification card. Referring now to FIG. 2, shown is an illustration of a locking mechanism in accordance with an embodiment of the present invention applied to a driver's license. As shown in FIG. 2, a similar mechanism to obscure identification information presented in an image of the license 20 can be realized. Thus as shown in FIG. 2, in a locked state, the identification information within image frame $25_a$ is unreadable, e.g., due to a pixel manipulation process. Instead in an unlocked state, the identification information is clearly seen, as shown in FIG. 2, namely in frame 25b.

Figure 3:
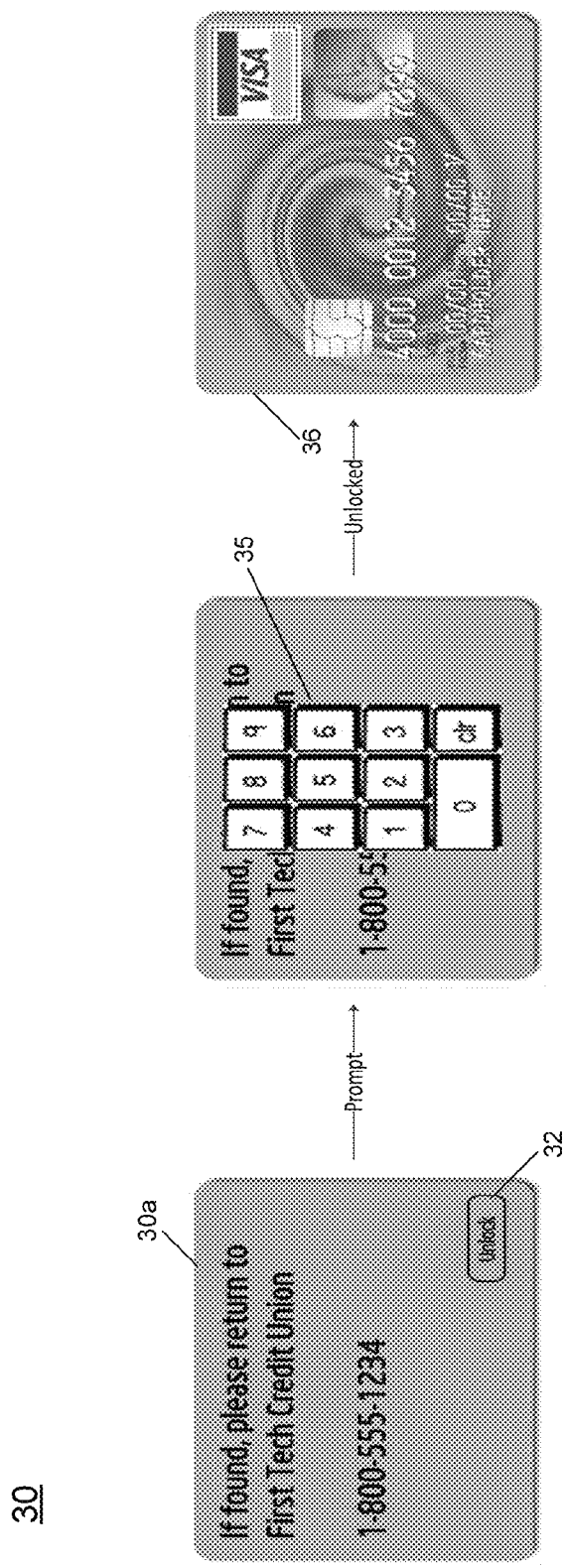
FIG. 3 is an illustration of a credit card that can be locked in accordance with an embodiment of the present invention.

Locking mechanisms in accordance with an embodiment of the present invention can be applied to many other types of objects to be accessed. Specifically referring now to FIG. 3, shown is an illustration of a credit card that can be locked in accordance with an embodiment of the present invention. For credit cards (even driver's licenses) and other access mechanisms including a magnetic strip or other type of stored electronic information and/or an embedded communication mechanism such as a near field communication (NFC) device, embodiments may lock these components as well to prevent their use unless the object is in an unlocked state.

As such, using an embodiment of the present invention, raw physical possession of an object protected by a locking mechanism in accordance with an embodiment of the present invention does not enable utility of the object. Instead, physical possession and an acceptable authentication code or possession of another type of unlock key is a prerequisite to enabling utility of the object.

In the embodiment shown in FIG. 3, a credit card 30 is in a locked state 30a in which no identifying information is displayed other than a text image showing an originating entity and a user input icon 32. After a user input on this icon, a keypad 35 is rendered to enable a user to input an authentication code, e.g., corresponding to an unlock code when an appropriate code is entered, an unobscured image 36 may be rendered, which includes the credit card information, and also enables any magnetic strip and/or embedded NFC device.

To receive touch input, the device may include a touch surface such as a touchpad on top of the display. In such embodiments, the device renders either the touchpad or an input icon (such as icon 32) on the display, e.g., the last time it was used and prior to powering down, such that the touchpad is persistent.

Although shown as a keypad and by way of a touch sequence, understand that the scope of the present invention is not limited in this regard and unlocking mechanisms can take many different forms. For example, in the illustration shown a touch sequence (e.g., numeric or alphanumeric keypad) can be used. In some embodiments this keypad may be randomized to prevent a malicious user from obtaining the authentication code by observing smudges on the surface and from handling the device. In other embodiments, instead of a keypad with numeric or alphanumeric entries, drawing shapes or connecting dots may be the authentication code entered by touch sequence. Still further, embodiments may enable an unlocking mechanism by way of a PIN number or other authentication code provided from a hardware or software token device. Still further embodiments may provide an unlocking mechanism by way of an authorized NFC device, such as providing a near field communication from a smartphone or other portable device paired with the access object to enable the unlocking of the object, e.g., for a predetermined amount of time.

Other embodiments of an unlocking mechanism can include a challenge issuance on the object (e.g., a QR code, PIN number or so forth) that is entered into another device such as a smartphone or other portable device to retrieve the authentication code to be entered. Yet another example unlocking mechanism may include some form of biometric input, e.g., fingerprint, voice, retina, DNA or so forth. In some embodiments, a third party authorization may be enabled such that the device may trust a user's smartphone to unlock it, and also trust a set of devices having a trusted cryptographic key such as a local police station or other government or non-government entity. Stated another way, a device may be provisioned in such a way that multiple unlock keys or multiple trusted parties can render content visible.

Note that once unlocked by an appropriate authentication code, the unobscured image may remain on the object for only a limited time. In different embodiments, an object may relock itself according to a security policy. As an example, a device may re-lock itself after a predetermined time. Or the device may be relocked by a user manually. Still further, the device may lock itself or cause the undistorted image to be cleared if an incorrect code is entered more than a threshold number of times.

Using embodiments of the present invention, many different types of use cases can be realized. For example, when applied to an e-paper document, the document can be unlocked when needed and otherwise the document is protected in the locked state. In one example, assume that the e-paper document is a vehicle registration, the document may remain in a user's car in a locked state and can be unlocked upon request (e.g., when requested by a police officer). Still further, embodiments can be used to protect identity documents such as passports, driver's licenses and so forth prior to use. Thus when such documents are lost or stolen, the threat of identity theft can be reduced or avoided. Embodiments may further be applied to protect security credentials such as a Verisign security token before displaying an authentication code, e.g., for use on a banking website. Embodiments can be used to protect a payment card such as a credit or debit card prior to use, e.g., protecting any image information as well as a magnetic strip or communication mechanism of the device. Thus in all these cases, users can continue to interact with a physical object in a manner with which they are familiar but with the enhancements provided herein, the contents of these objects may be secured.

Figure 4A:
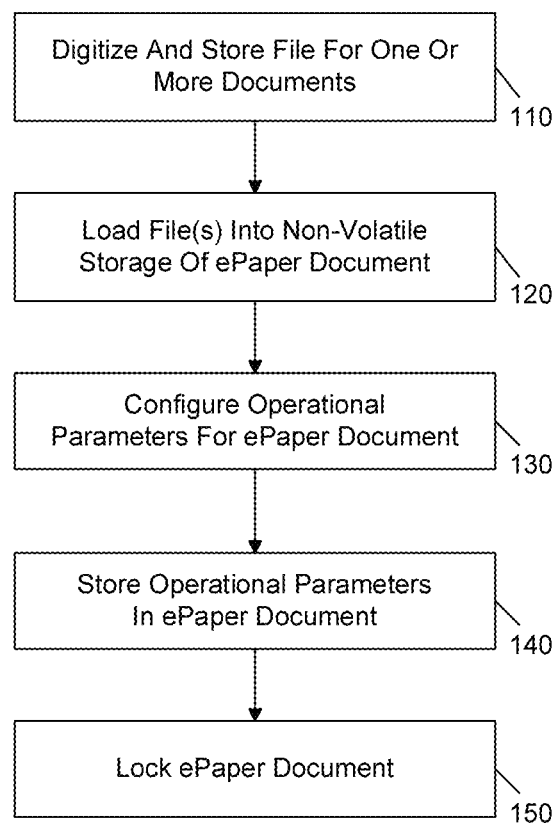
FIG. 4A is a flow diagram of a method for generating a secure e-paper document in accordance with an embodiment of the present invention.

As described above, embodiments may enable an end user to create secure documents. Referring now to FIG. 4A, shown is a flow diagram of a method for generating a secure e-paper document in accordance with an embodiment of the present invention. As shown in FIG. 4A, method 100 may be performed by an end user that seeks to protect information to be stored in an e-document. Assume for purposes of discussion that the end user seeks to create an e-paper document that provides for the display of various types of identification information. For purposes of example, assume that these different identification documents include a driver's license, vehicle registration document, proof of insurance document, among potentially others. As seen in FIG. 4A, method 100 may begin by digitizing and storing a file for each of these documents (block 110). Although embodiments apply equally to creation of an e-paper document having only one image, for purposes of illustration here understand that multiple images may be present. In one embodiment, a user may digitize and store files using a personal computer of the user and a corresponding scanner or other digitizer. Or in other embodiments, a user may obtain image files, e.g., from an issuing entity such as a DMV or other entity.

Next, the user may load these files into a non-volatile storage of the e-paper document (block 120). As will be described further below in general an e-paper document may include storage and processing capabilities. As such, the user may load these files into the non-volatile storage. As one example, this loading can be performed using the user's personal computer as connected to the e-paper, e.g., via a wired or wireless connection. Next, the user may be allowed to configure the operational parameters for the e-paper document (block 130). For example, via a graphical user interface (GUI) present on the user's computer, various parameters of the e-paper document such as the location at which to display an image, the type of authentication code required, the length of display time, the number of users that are allowed to unlock the image or so forth, can be set. Then at block 140 these operational parameters can be stored in the e-paper document. Such information may be downloaded as a configuration file for storage in the non-volatile storage of the e-paper document. Note that in some embodiments, these configurable parameters may also have defaults to simplify the interaction.

Still referring to FIG. 4A, next at block 150 the e-paper document can be locked. In this way, the information may remain secure. As described above, in an embodiment, this locking of the e-paper document still enables an obscured view of the information present in at least one of the images (e.g., a blurred view). Although shown at this high level in the embodiment of FIG. 4A, understand the scope of the present invention is not limited in this regard. For example, although FIG. 4A is shown to generate an e-paper document by an end user, as described above similar operations can be performed to provision an e-paper document or other electronic displays by an issuing entity or an intermediary.

Figure 4B:
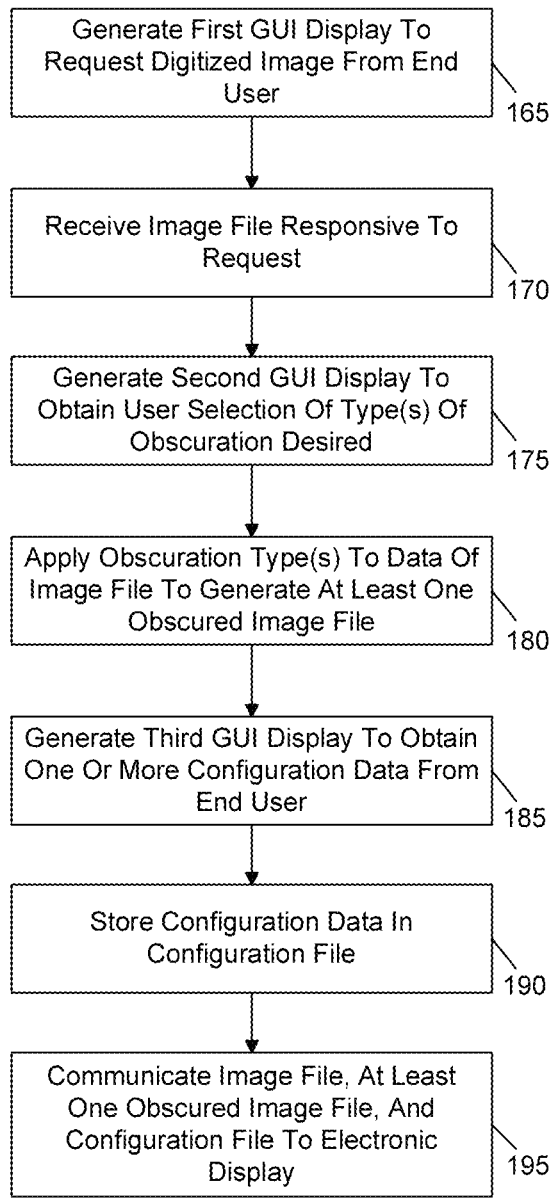
FIG. 4B is a flow diagram of a method for configuring an electronic display with image data and other associated information in accordance with an embodiment of the present invention.

Referring now to FIG. 4B, shown is a flow diagram of a method for configuring an electronic display with image data and other associated information in accordance with an embodiment of the present invention. For purposes of example, assume that the electronic display is an e-paper document. Of course, in other embodiments another type of electronic display such as of a portable device, e.g., an e-reader, tablet computer or so forth may instead be the electronic display. And in yet other embodiments, an auxiliary or other display of a portable computer may be the electronic display.

For purposes of illustration, FIG. 4B shows a method 160 which can be performed within a personal computer of an end user when the end user is seeking to configure the electronic display with images. In some embodiments, method 160 may be implemented at least in part using a software application executing on one or more processors of the computer system, which may be downloaded via the Internet or otherwise obtained and stored in a memory or other storage of the computer system. In general, the method enables the user to select images for display, configure various parameters of the electronic display and download the configured image data and configuration information to the electronic display. Method 160 may begin by generating a first graphical user interface (GUI) display to request a digitized image from an end user (block 165).

Control next passes to block 170 where an image file may be received responsive to this request. For example, the end user may scan in a document, e.g., via a scanner or other digitizer coupled to the computer, to thus enable receipt of the image file responsive to the request (block 170).

Still referring to FIG. 4B, next a second GUI display may be generated (block 175). Specifically with this second display, the application may seek to obtain a user selection of one or more types of obscuration desired to be applied to the image. Example obscuration methods may include a blurring obscuration, a pixel rearrangement obscuration, a blank image obscuration, a textual image obscuration such as a text name of the type of image under protection, among many others. Thus the application may receive from the end user an indication of one or more of these obscurations to apply. Control next passes to block 180 where these one or more selected types of obscuration may be applied to data of the image file to generate at least one obscured image file. For example, the data of the image, which may be in the form of a bitmap or other pixel values, may be manipulated as appropriate, e.g., via blending operations, pixel manipulations such as movements or so forth, to enable generation of at least one obscured image file.

Still referring to FIG. 4B, control next passes to block 185 where a third GUI display can be generated to obtain one or more configuration data from the end user. As examples, this configuration data may include various configurable parameters regarding the electronic display that can be set by the user. As a few such examples, this configuration data may include a length of time that an unlocked image is to be displayed before reverting back to a locked image, a type of authentication code such as keypad entry, other touch input or so forth, ability to provide for multi-party authentication and unlocking, specification of a single authentication code or an authentication code per document, behavior in response to an incorrect code such as locking for a period of time or erasing the device or document, among many others. For example, in some embodiments, the unlocking mechanism may be provided by a second party device having an NFC device such as a keychain device with rolling codes. In some embodiments, the keychain device and authentication logic of the object may be provisioned together and have the same known root secret and synchronized clocks, such that both provide the same token within a given time window. Instead of a keychain device, a soft token may be provided as an application on a device such as a smartphone.

This configuration data may thus be received and stored in a configuration file (block 190). Finally, all of the obtained information, namely the image file, one or more obscured image files generated and the configuration file may be communicated to the electronic display (block 195). Different manners of downloading this information into a storage means of the electronic display are possible. For example, a wired or wireless communication may occur.

Thus in FIG. 4B, an application to be executed on a computer system of a user can enable the user to input one or more image files (note that the flow diagram of FIG. 4B may be executed iteratively for any number of input image files), perform obscuration operations and configuration operations to thus generate and store a set of files into the electronic display. Note that although shown with this particular set of operations in FIG. 4B understand the scope of the present invention is not limited in this regard. For example, the obscuration operations described above may be performed in the personal computer by the application in embodiments in which the electronic display includes processing means of relatively limited capabilities. As such, the electronic display need not generate obscured images dynamically and can instead simply display a stored obscuration image. In other implementations, the obscuring can be performed dynamically by a processing means of the electronic display.

Figure 5:
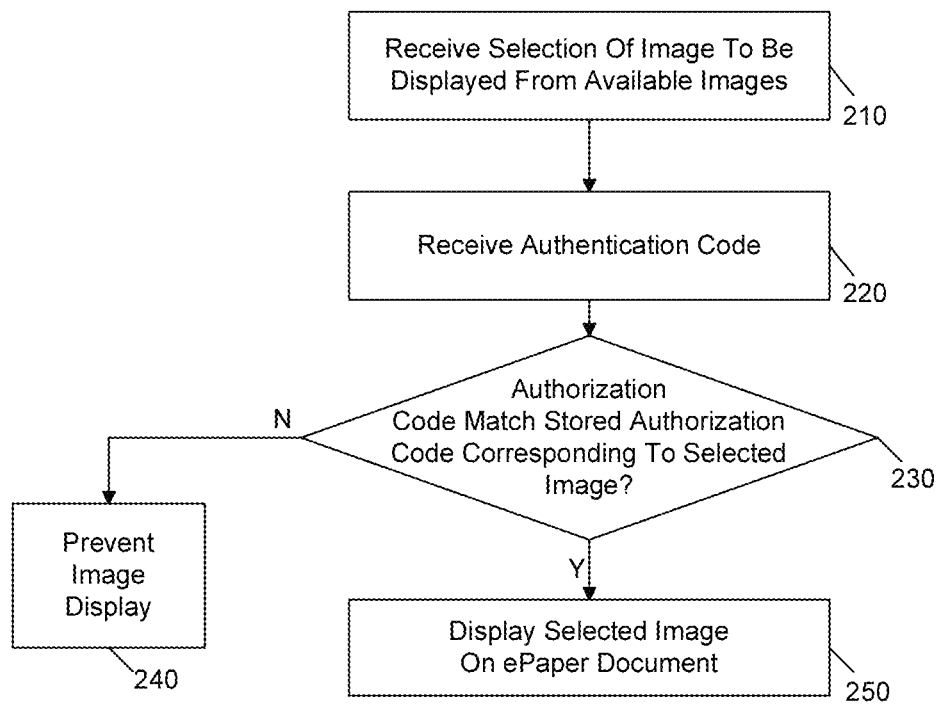
FIG. 5 is a flow diagram of a method for performing access authentication in accordance with an embodiment of the present invention.

Referring now to FIG. 5, shown is a flow diagram of a method for performing access authentication in accordance with an embodiment of the present invention. As shown in FIG. 5, method 200 may be performed by authentication logic of an e-paper document or other access-protected object in accordance with an embodiment of the present invention. Method 200 may begin by receiving a selection of an image to be displayed from available images (block 210). For example, in an implementation in which an e-paper document includes multiple images that are capable of display, the authentication logic may receive a user input, e.g., a touch sequence or other indication of a selection of one of these multiple images. For example, a set of numbers can be presented on the e-paper display for the user to select a number associated with the type of document, or the names of the different types of documents may be displayed for selection. Still further in accordance with the obscure mechanisms described herein, small thumbnail images of the available images can be displayed and a user can select the one to be unlocked.

Still referring to FIG. 5 next control passes to block 220 where an authentication code can be received. As one example, this authentication code may be a touch sequence entered by the user. In some embodiments each image to potentially be unlocked may be associated with a different authentication code, or a single authentication code may be used to unlock multiple images.

Control next passes to diamond 230 where it can be determined whether this authentication code matches a stored authentication code corresponding to the selected image. If not, control passes to block 240 where the display of the image can be prevented. This prevention can be realized simply by maintaining a current obscured view. Otherwise if a correct authentication code is received, control passes to block 250 where the image can be properly displayed. For example, a rendering logic can be controlled to enable rendering of the full image. Although shown at this high level in the embodiment of FIG. 5, understand the scope of the present invention is not limited in this regard.

Figure 6:
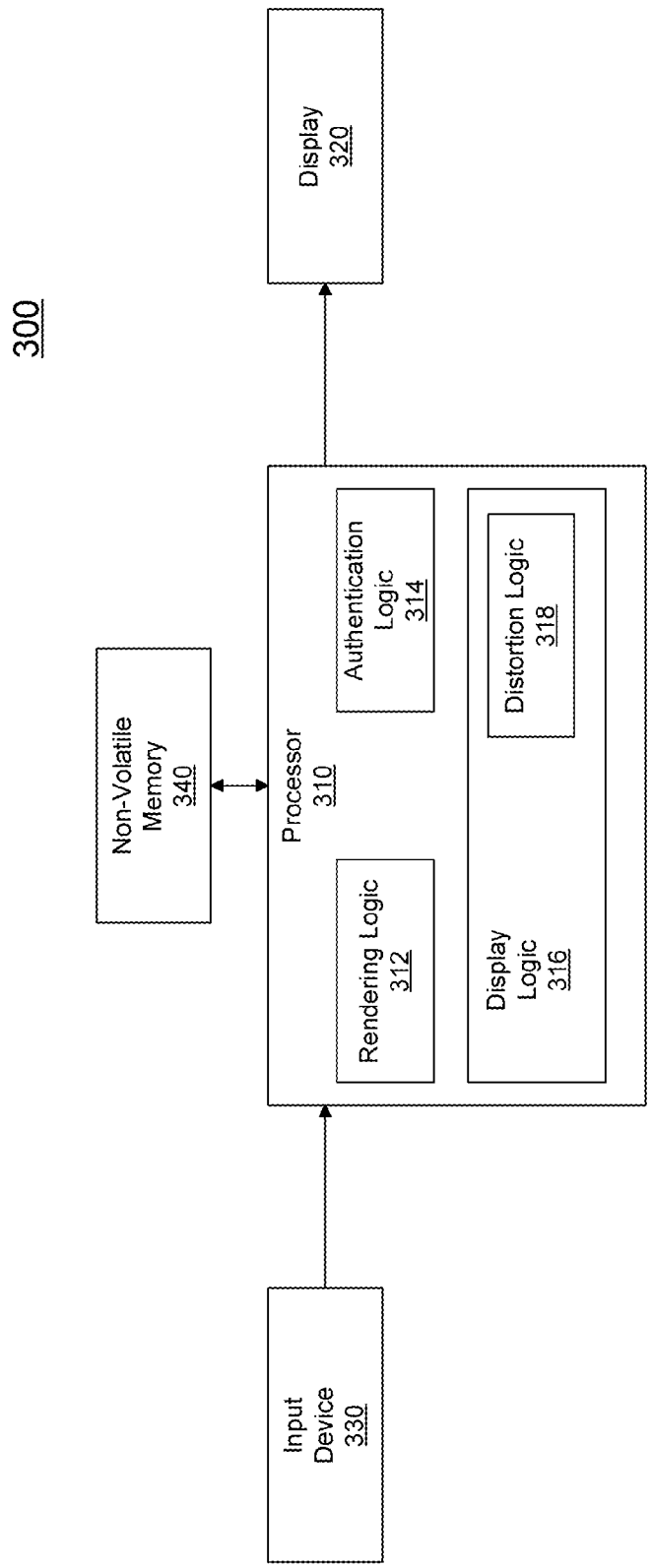
FIG. 6 is a block diagram illustrating components present in an e-paper document or other electronic display capable of performing locking techniques as described herein.

Referring now to FIG. 6, shown is a block diagram illustrating components present in an e-paper document or other electronic display capable of performing locking techniques as described herein. As seen in FIG. 6, document 300 may include a processor 310 which in an embodiment may be a processing engine of relatively low power operation. For example, a relatively small in-order processor core may be provided. In the embodiment shown, processor 310 may include a rendering logic 312 that can be configured to render an image, an authentication logic 314 that can enable the image to be unlocked responsive to entry of an appropriate authentication code, and a display logic 316 to enable display of an image. As seen, display logic 316 may include an obscuration or distortion logic 318 to cause the image to be displayed in an unreadable manner, with a given type of distortion as described above.

Still referring to FIG. 6, processor 310 may be coupled to a display 320 to thus display the rendered image. Still further, processor 310 may couple to a non-volatile memory 340 that may store a plurality of images, configuration information as well as control programs for the processor and its various components. An input device 330 may be provided to enable communication of user input such as authentication codes, user selections and so forth to processor 310.

In general, document 300 may be maintained in a low power state in which the power supply is turned off to most or all components, and the display may be maintained persistently in the absence of power delivery to it. In one such embodiment, all components may be placed in a low power state and input device 330 may periodically be powered on to determine whether a user input is received, e.g., via a touchpad. And if so, a remainder of the system, including the processor, may be powered on. Although shown at this high level in the embodiment in FIG. 6, understand the scope of the present invention is not limited in this regard.

Figure 7:
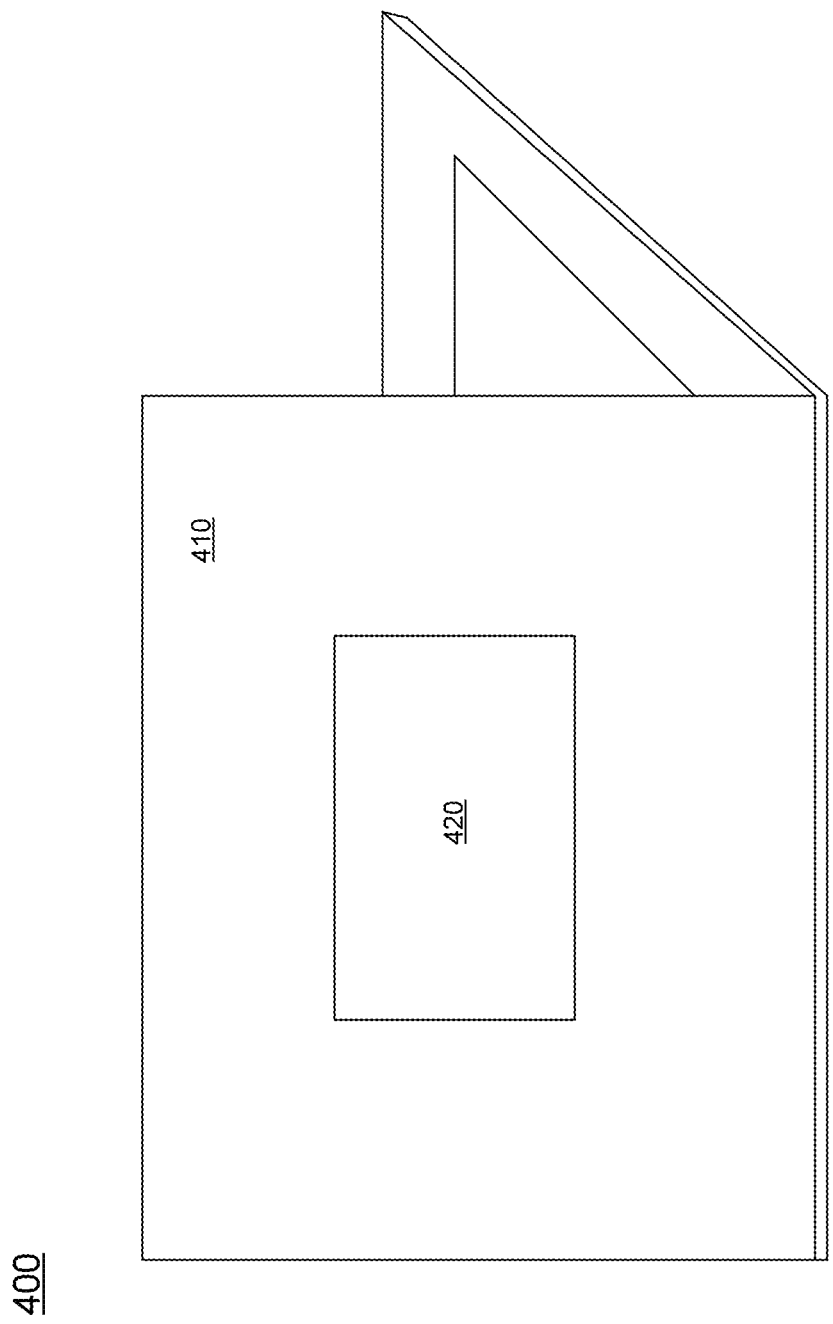
FIG. 7 is an illustration of a portable computer including an auxiliary display in accordance with an embodiment of the present invention.

As described above, embodiments may be applied to many different types of displays. As one such example, FIG. 7 shows the presence of a portable computer 400 such as a laptop, Ultrabook™ or other thin and light notebook computer. As seen in FIG. 7, on a backside of a display portion 410, an auxiliary display 420 may be provided. Using this display, even when the clamshell-based design is closed, at least certain information may be displayed on auxiliary display 420. Furthermore, using an embodiment of the present invention this auxiliary display, which may be an LED or LCD display, can be protected using the locking techniques described herein.

Figure 8:
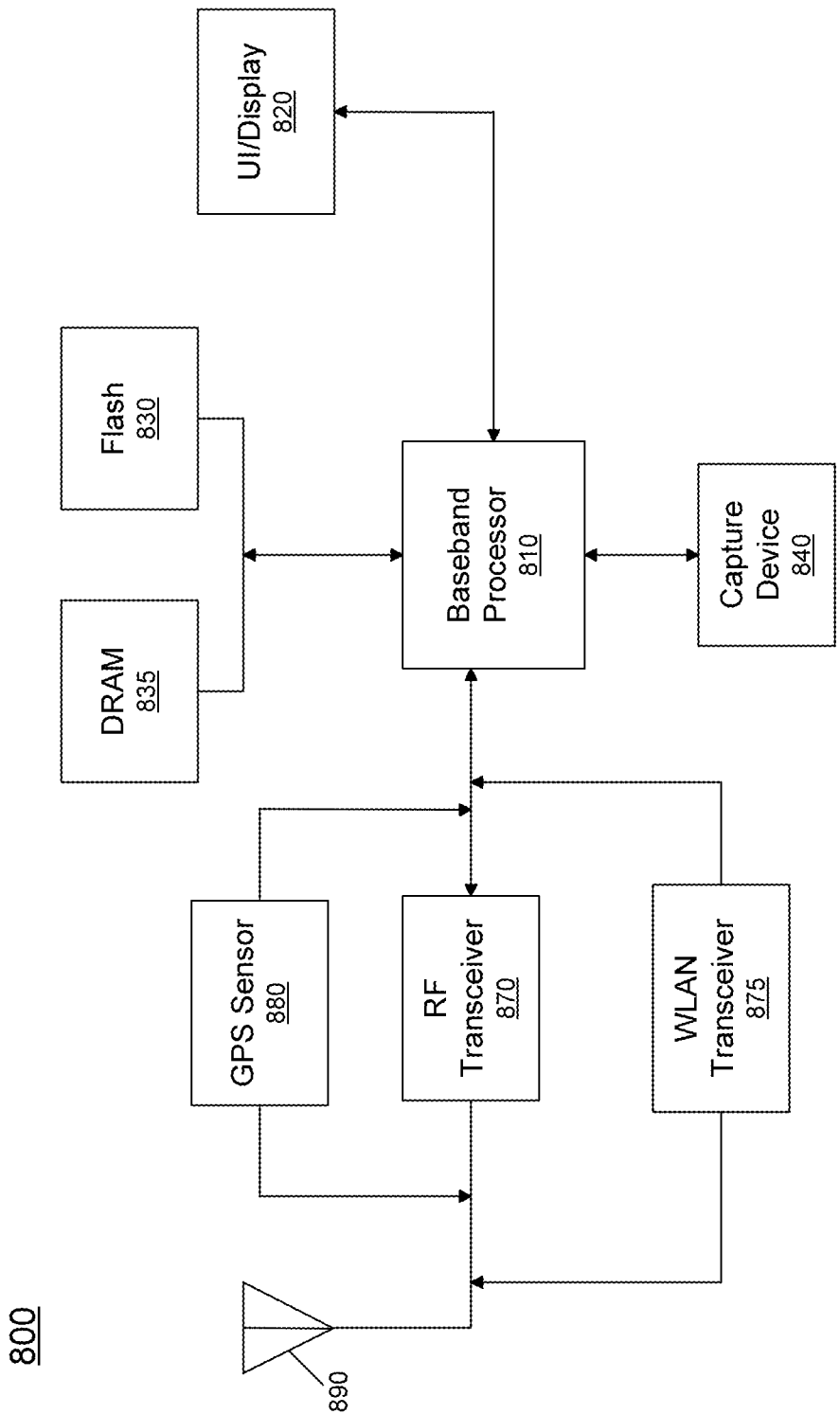
FIG. 8 is a block diagram of an example system with which embodiments can be used.

Embodiments can be used in many different environments. Referring now to FIG. 8, shown is a block diagram of an example system 800 with which embodiments can be used. As seen, system 800 may be a smartphone or other wireless communicator. As shown in the block diagram of FIG. 8, system 800 may include a baseband processor 810 to perform various signal processing with regard to communications, as well as perform computing operations for the device. In various embodiments, baseband processor 810 may perform display renderings as described herein. In turn, baseband processor 810 can couple to a user interface/display 820 which can be realized, in some embodiments by an e-ink display that may operate to display certain secure information only after authorization as described herein. In addition, baseband processor 810 may couple to a memory system including, in the embodiment of FIG. 8 a non-volatile memory, namely a flash memory 830 and a system memory, namely a dynamic random access memory (DRAM) 835. As further seen, baseband processor 810 can further couple to a capture device 840 such as an image capture device that can record video and/or still images.

To enable communications to be transmitted and received, various circuitry may be coupled between baseband processor 810 and an antenna 890. Specifically, a radio frequency (RF) transceiver 870 and a wireless local area network (WLAN) transceiver 875 may be present. In general, RF transceiver 870 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 880 may be present. Other wireless communications such as receipt or transmission of radio signals, e.g., AM/FM and other signals may also be provided. In addition, via WLAN transceiver 875, local wireless signals, such as according to a Bluetooth™ standard or an IEEE 802.11 standard such as IEEE 802.11a/b/g/n can also be realized.

Although shown at this high level in the embodiment of FIG. 8, understand the scope of the present invention is not limited in this regard.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

The following examples pertain to further embodiments.

In an embodiment, an apparatus includes a display to display an image persistently in absence of power delivery to the display, an authentication logic to determine whether an authentication code received from an end user corresponds to an authentication code associated with the image, a render logic to render the image for display on the display, and a display logic to enable display of the image in a readable format when the authentication code corresponds to the associated authentication code, and to otherwise display the image in an unreadable format in which information of the image is unreadable but a type of document represented by the image is determinable.

The apparatus further includes a non-volatile storage to store multiple images including the image, where the end user loads the plurality of images into the non-volatile storage.

The apparatus further includes at least one of a magnetic strip including user information and a near field communication (NFC) device, and where the authentication logic is to prevent access to the magnetic strip and/or the NFC device when the received authentication code does not correspond to the associated authentication code.

The apparatus may further include an auxiliary display configured on a backside of a display portion of a portable computer. The display may be an e-paper document that is generated by the end user.

The display logic is further to enable display of a touchpad overlaid on at least a portion of the image in the unreadable format prior to the absence of power delivery to enable persistent display of the touchpad, and the apparatus may be configured to wake up from a low power mode responsive to input on the touchpad from the end user.

The apparatus further includes a processor including the authentication logic, the render logic, and the display logic, where the processor further includes an obscuration logic to generate the image in the unreadable format. Note that the type of obscuration is selectable by the end user.

In another embodiment, an article includes a non-transitory storage medium including instructions that when executed enable a system to: receive an image file corresponding to a digitization of an image sought to be protected by an end user; enable the end user to select a type of obscuration to be applied to the image; apply the obscuration type to data of the image file to generate an obscured image file; and communicate the image file and the obscured image file to an electronic display associated with a compute device to enable persistent display of a selected image in absence of power delivery to the electronic display.

The article may further include instructions that enable the system to obtain one or more configuration parameters from the end user and to store the parameters into a configuration file, and to communicate the configuration file to the electronic display.

The article may further include instructions that enable the system to receive the image file from a scanner coupled to the system.

The article may further include instructions that enable the system to provide a graphical user interface to seek input from the end user regarding selection of one or more obscuration types to be applied to the image.

In another embodiment, a method includes: receiving, in a processor of a persistent electronic display, an authentication code from an end user; determining, in the processor, whether the received authentication code corresponds to a stored authentication code; and displaying a selected image on the persistent electronic display if the received authentication code corresponds to the stored authentication code, and otherwise displaying an obscured image on the persistent electronic display, where the obscured image is in an unreadable format in which information of the selected image is unreadable but a type of document represented by the selected image is determinable.

The method further includes receiving, in the processor, a selection of the selected image to be displayed from a plurality of available images stored in the persistent electronic display.

The method further includes receiving an image file corresponding to the selected image and an obscured image file corresponding to the obscured image from a computer of the end user, and storing the image file and the obscured image file in a non-volatile storage of the persistent electronic display.

The method further includes enabling display of a touchpad overlaid on at least a portion of the obscured image prior to an absence of power delivery to the persistent electronic display to enable persistent display of the touchpad.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a display to display an image persistently in absence of power delivery to the display;
an authentication logic to determine whether an authentication code received from an end user corresponds to an authentication code associated with the image;
a render logic to render the image for display on the display; and
a display logic to enable display of the image in a readable format when the authentication code corresponds to the associated authentication code, and to otherwise display the image in an unreadable format in which information of the image is unreadable but a type of document represented by the image is determinable.

2. The apparatus of claim 1, further comprising a non-volatile storage to store a plurality of images including the image, wherein the end user is to load the plurality of images into the non-volatile storage.

3. The apparatus of claim 1, further comprising at least one of a magnetic strip including user information and a near field communication (NFC) device, and wherein the authentication logic is to prevent access to the at least one of the magnetic strip and the NFC device when the received authentication code does not correspond to the associated authentication code.

4. The apparatus of claim 1, wherein the display comprises an auxiliary display configured on a backside of a display portion of a portable computer.

5. The apparatus of claim 1, wherein the display comprises an e-paper document, the e-paper document generated by the end user.

6. The apparatus of claim 1, wherein the display logic is further to enable display of a touchpad overlaid on at least a portion of the image in the unreadable format prior to the absence of power delivery to enable persistent display of the touchpad.

7. The apparatus of claim 6, wherein the apparatus is configured to wake up from a low power mode responsive to input on the touchpad from the end user.

8. The apparatus of claim 1, further comprising a processor including the authentication logic, the render logic, and the display logic.

9. The apparatus of claim 8, wherein the processor further comprises an obscuration logic to generate the image in the unreadable format.

10. The apparatus of claim 9, wherein a type of obscuration is selectable by the end user.

11. An article comprising at least one non-transitory storage medium including instructions that when executed enable a system to: receive, in a processor of the system, an image file, the image file corresponding to a digitization of an image sought to be protected by an end user; enable, via an input device of the system, the end user to select a type of obscuration to be applied to the image; apply, in the processor, the obscuration type to data of the image file to generate an obscured image file; and communicate, from the system, the image file and the obscured image file to an electronic display associated with a compute device to enable persistent display of a selected image in absence of power delivery to the electronic display.

12. The article of claim 11, further comprising instructions that enable the system to obtain one or more configuration parameters from the end user and to store the one or more configuration parameters into a configuration file.

13. The article of claim 12, further comprising instructions that enable the system to communicate the configuration file to the compute device for storage in a non-volatile storage of the compute device.

14. The article of claim 11, further comprising instructions that enable the system to receive the image file from a scanner coupled to the system.

15. The article of claim 11, further comprising instructions that enable the system to provide a graphical user interface to seek input from the end user regarding selection of one or more obscuration types to be applied to the image.

16. A method comprising:
receiving, in a processor of a persistent electronic display, an authentication code from an end user;
determining, in the processor, whether the received authentication code corresponds to a stored authentication code; and
displaying a selected image on the persistent electronic display if the received authentication code corresponds to the stored authentication code, and otherwise displaying an obscured image on the persistent electronic display, the obscured image in an unreadable format in which information of the selected image is unreadable but a type of document represented by the selected image is determinable.

17. The method of claim 16, further comprising receiving, in the processor, a selection of the selected image to be displayed from a plurality of available images stored in the persistent electronic display.

18. The method of claim 16, further comprising:
receiving an image file corresponding to the selected image and an obscured image file corresponding to the obscured image from a computer of the end user; and
storing the image file and the obscured image file in a non-volatile storage of the persistent electronic display.

19. The method of claim 16, further comprising enabling display of a touchpad overlaid on at least a portion of the obscured image prior to an absence of power delivery to the persistent electronic display to enable persistent display of the touchpad.

20. The method of claim 19, further comprising waking up the processor from a low power mode responsive to input on the touchpad from the end user.

21. The method of claim 16, further comprising receiving the authentication code via a near field communication with a computing device of the end user.

* * * * *